Jan. 25, 1949.   A. LOVE   2,460,095
INSTRUMENT FOR MEASURING RESISTANCES
Filed Nov. 22, 1944

INVENTOR
Angus Love

By Watson, Cole, Grindle & Watson

Patented Jan. 25, 1949

2,460,095

UNITED STATES PATENT OFFICE 2,460,095

INSTRUMENT FOR MEASURING RESISTANCES

Angus Love, Cumnor, England

Application November 22, 1944, Serial No. 564,664
In Great Britain May 22, 1944

2 Claims. (Cl. 175—183)

This invention consists in improvements in or relating to instruments for measuring high resistances and has for its object to provide an instrument which will be more easily and cheaply manufactured than instruments for a similar purpose of the present day.

Generally high resistance measuring instruments incorporate a hand driven generator which is designated to produce a direct-current and has permanent magnet excitation. The result of this is that the generator voltage is a function of the speed of rotation and to obtain a reasonably constant test voltage a speed limiting device in the form of a centrifugally controlled slipping clutch is interposed between the driving handle and the armature. Such instruments are largely used for insulation resistance testing and comprise essentially a hand driving means, a speed limiting device, a wound armature rotating in a permanent magnetic field with a commutator to produce unidirectional voltage, and a moving coil meter either of the single or "cross-coil" type.

Simplification of such an instrument for the measurement of high resistance under electric potential is accomplished by the present invention which comprises in combination, a generator giving alternating current of a frequency proportional to the speed of rotation, a frequency dependent circuit containing inductance, resistance and capacity, a static rectifier, a pair of terminals for a test piece, means for indicating when a required voltage is passing and a current measuring device. Such a generator is conveniently combined with a static voltage-limiting device and a static rectifier through which the output from the generator is passed to a moving coil meter and to the test connections.

Conveniently the static voltage limiting device is a frequency-dependent circuit containing resistance inductance and capacity.

In order that the invention may be more clearly understood two preferred examples will now be described with the aid of the accompanying drawings in which—

Figure 1:
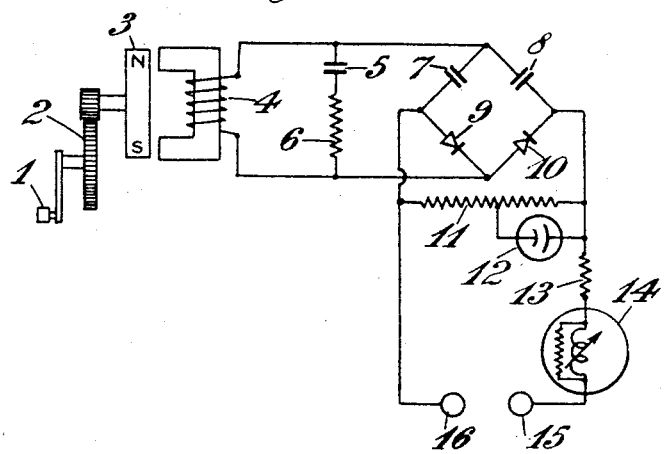
Figure 2:
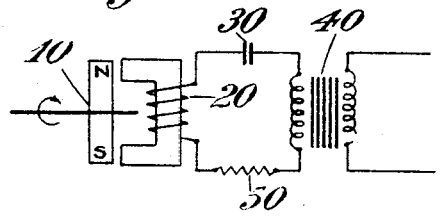

Figure 1 is a circuit diagram showing symbolically components of the instrument, and Figure 2 simply illustrates a modification of a part of that circuit.

Referring to Figure 1, the generator comprises a permanent magnet 3, rotated between the poles of an iron cored inductance 4 by a hand crank 1 through step-up gearing 2. The output from the inductance 4 is shunted by a condenser 5 and a resistance 6.

The impedance of this shunt decreases with increased frequency whilst the impedance of the inductance 4, increases and the values of these components are so chosen that the voltage of the alternating current delivered to the rectifier reaches the desired value at a convenient speed of rotation and remains substantially constant up to the maximum speed at which the generator can normally be driven by hand. This voltage is applied to a bridge rectifier circuit comprising the condensers 7 and 8 and the metal rectifiers 9 and 10. The rectified output from the bridge is shunted by the high resistance 11 in parallel with part of which is the gas discharge indicator lamp 12.

When the required voltage is reached the indicator lamp 12 lights up. A current limiting resistance 13 is provided in series with the sensitive milliamperemeter 14, the circuit being completed by the resistance under test connected to the terminals 15 and 16.

Alternatively to the method of voltage control described above any suitable type of resonance circuit may be used having a flat topped peak. An example of such a resonance circuit is shown in Figure 2 where the output from the generator, which latter comprises a rotating magnet 10 and iron cored inductance 20, is connected in series with a condenser 30 and a resistance 50 to the input side of a transformer 40 the secondary of which is connected to the rectifier. The complete apparatus will embody the other features of the circuit diagram of Figure 1, so that the secondary winding of the transformer 40 will be connected to that part of the apparatus to which the terminals of the windings 4 are connected in Figure 1. The values of inductance, resistance and capacity are so chosen that when the required voltage has been reached at a convenient speed of rotation, it remains substantially constant up to the maximum speed at which the generator can normally be driven by hand. Complex resonance circuits comprising a plurality of oscillatory circuits may be employed.

Alternatively to such frequency dependent means of voltage control any other known means of limiting an alternating voltage may be used as for example by the use of saturated iron cored chokes or transformers with or without air gaps, but as in this particular application the generator voltage and frequency are interdependent I prefer to use frequency dependent methods to limit the voltage. It will be understood that there is a large variety of arrangements which can be used to produce the desired relationship between frequency and voltage and it is both impossible and unnecessary to describe all possible and convenient arrangements. Two such arrangements have however been described above.

Alternatively to the metal rectifier bridge circuit described above any other known arrangement of metal rectifier circuit may be used or any other form of static rectifier such as a thermionic valve or valves may be employed.

Alternatively to the single coil moving coil meter described above, a meter of the cross-coil type may be used to indicate the value of the resistance.

The type of instrument described above is primarily intended to be turned by hand but there is, in certain circumstances, nothing to prevent such an instrument being driven by mechanical power.

I claim:

1. An instrument for the measurement of a direct current resistance comprising in combination a hand-driven rotating-magnet generator giving an alternating current of a frequency proportional to the speed of rotation, a frequency dependent circuit including the stator winding of the generator as an inductance, with resistance and capacity in parallel connection therewith, a static voltage doubler rectifier energized from the output of said frequency dependent circuit supplying a direct current to a pair of terminals for a test piece, a high resistance shunted across the output of said rectifier with a gas discharge lamp connected in parallel with part of said resistance and a current measuring device connected in series between one of said terminals and said rectifier.

2. An instrument for the measurement of a direct current resistance comprising in combination a hand-driven rotating-magnet generator giving an alternating current of a frequency proportional to the speed of rotation, feeding a frequency dependent circuit including the stator winding of the generator as an inductance, with resistance and capacity in series therewith feeding the primary winding of a transformer the secondary winding of which is connected to a static rectifier supplying direct current to a pair of terminals for a test piece a high resistance shunted across the output of said rectifier with a gas discharge lamp connected in parallel with part of said resistance and a current measuring device connected in series between one of said terminals and said rectifier.

ANGUS LOVE.

REFERENCES CITED

The following references are of record in the file of this patent:

UNITED STATES PATENTS

| Number | Name | Date |
|---|---|---|
| 1,397,641 | Kolff | Nov. 22, 1921 |
| 1,513,633 | Scheller | Oct. 28, 1924 |
| 1,681,367 | Rolfe | Aug. 21, 1928 |
| 1,918,834 | Crago | July 18, 1933 |
| 2,218,859 | Schweitzer | Oct. 22, 1940 |
| 2,272,239 | Delmhorst | Feb. 10, 1942 |

FOREIGN PATENTS

| Number | Country | Date |
|---|---|---|
| 355,157 | Great Britain | Aug. 20, 1931 |

OTHER REFERENCES

General Electric Review, May 1941, pages 263-266.

Wireless World, Aug. 1943, pages 224, 227.